July 30, 1968   R. P. WELLS ET AL   3,394,485
BUTT CAP FOR FISHING RODS
Filed April 28, 1966
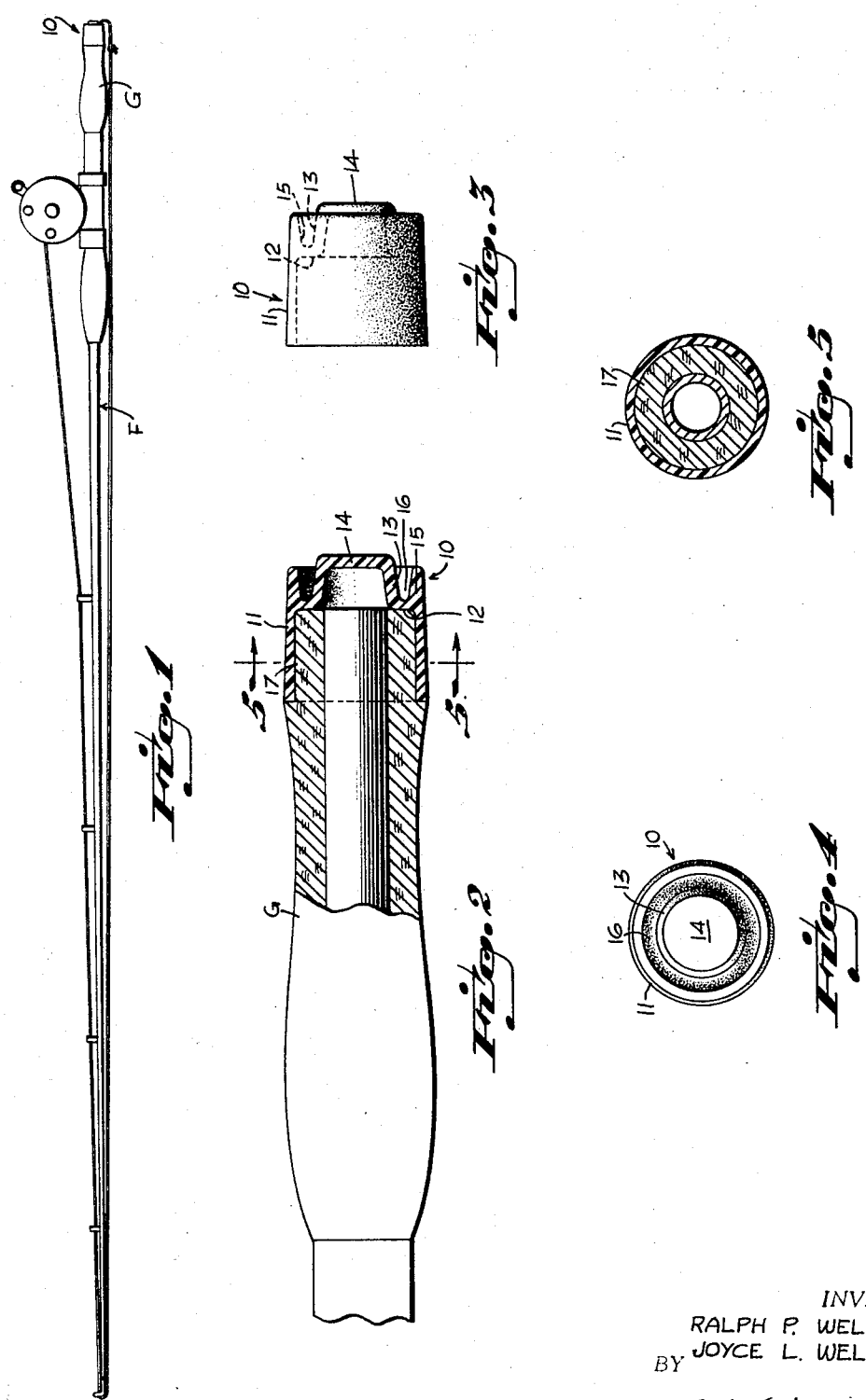
INVENTORS.
RALPH P. WELLS
BY JOYCE L. WELLS
E. H. Schmidt
ATTORNEY.

United States Patent Office 3,394,485
Patented July 30, 1968

3,394,485
BUTT CAP FOR FISHING RODS
Ralph P. Wells and Joyce L. Wells, both of 4000 NW.
190th St., Miami, Fla. 33169
Filed Apr. 28, 1966, Ser. No. 545,891
4 Claims. (Cl. 43—25.2)

This invention relates to fishing rods and is directed particularly to a novel butt cap for use at the outer end of a fishing rod butt grip.

Better quality fishing rods are customarily provided with a butt grip, usually of cork, the outer end of which is fitted with a wear-resisting and strengthening cup-like metal or synthetic plastic cap. The principal object of this invention is to provide an improved butt cap for use with fishing rods which will be stronger than ordinary butt caps heretofore used, and which at the same time provides means for securing a fish hook at the end of a fishing line used with the associated rod in such a manner that the barb is covered to protect against injury by the hook while the assembled rod is not being used.

A more particular object is to provide a butt cap of the character described which can readily be injection molded of synthetic plastic materials in mass production.

Yet another object is to provide a butt cap so designed as to have great strength while at the same time being economical in the use of materials.

A more particular object is to provide a butt cap of the above nature which is in the form of a tapered outer sleeve, open at the larger end and integrally formed with an annular false bottom portion spaced inwardly from the smaller end, the false bottom being integral with an outwardly-extending, coaxial inner sleeve portion the outer end of which merges with an integral bottom wall portion lying in a plane parallel with but slightly outwardly removed from the outer end of the outer sleeve.

Other objects, features and advantages of the invention will be apparent from the following description when read with reference to the accompanying drawings. In the drawings, wherein like reference numerals denote corresponding parts throughout the several views:

FIG. 1 is a side view of an assembled fishing rod having a butt grip equipped with a butt cap embodying the invention and illustrating how a fish hook can be protectively attached to the butt cap for storage;

FIG. 2 is an enlarged view of the butt grip portion of the fishing rod illustrated in FIG. 1, partly in longitudinal section to illustrate structional details of the butt cap;

FIG. 3 is a side view of the butt cap, shown separately;

FIG. 4 is an end view thereof; and

FIG. 5 is a transverse cross-sectional view taken along the line 5—5 of FIG. 2 in the direction of the arrows.

Referring now in detail to the drawings, F in FIG. 1 designates a fishing rod having a cork butt grip G fitted at its outer end with a butt cap 10 embodying the invention. The butt cap 10 is preferably integrally molded of a tough synthetic plastic material, and comprises a slightly tapered outer sleeve portion 11 open at the large diameter end and formed with an annular false bottom portion 12 spaced inwardly from the small diameter end by about one-third the length of the butt cap. The inner peripheral edge of the false bottom portion 12 merges into an outwardly-extending, convergingly-tapered, coaxial inner sleeve portion 13 the outer end of which merges with a bottom wall portion 14 lying in a plane parallel with, but slightly outwardly removed from, the outer end of the outer sleeve portion 11. As illustrated in FIGS. 2 and 3, the interior wall of that part of the outer sleeve portion 11 surrounding the inner sleeve portion 13 is of gradually increasing thickness from its outer to its inner end, as indicated at 15, so as to define, with said inner sleeve portion, an annular recess 16, the inner and outer walls of which are divergent.

As illustrated in FIG. 2, the butt grip G is provided with a reduced diameter portion 17 of such length and diameter as to permit force-fitting the butt cap 10 in place during manufacture of a fishing rod for frictional retention, with the outer end of said butt grip seated against the inner surface of the annular false bottom portion 12.

As illustrated in FIG. 1, when an assembled fishing rod is to be used intermittently as on board a boat while fishing, or carried or stored, the hook can conveniently be engaged in the recess 16 of the butt cap and the line drawn taut to hold it in place, thereby protecting against such accidental injury as occasionally happens when the points and barbs of hooks are left uncovered.

Another important advantage of the invention resides in the fact that the bottom wall portion 14, because it extends outwardly beyond the outer end of the outer sleeve portion 11, takes most of the wear and stress when the rod is placed in standing position in a corner, for example.

Still another advantage is that in certain butt grip constructions wherein the butt grip is secured to the rod by a nut at the outer end of the grip, the recess provided within the inner sleeve portion 13 serves as a convenient means for enclosing said nut.

While I have illustrated herein only one form in which my invention can conveniently be embodied in practice, it is to be understood that this form is given by way of example only, and not in a limiting sense. The invention, in brief, comprises all the embodiments and modifications coming within the scope and spirit of the following claims.

What we claim as new and desire to secure by Letters Patent is:

1. In a butt cap for use at the outer end of a fishing rod butt grip, the combination comprising, a tapered outer sleeve portion, an annular false bottom portion integrally formed within said outer sleeve portion and spaced inwardly from the smaller end thereof by a distance of about one-third the length of said outer sleeve portion, an inner sleeve portion of lesser diameter than that of said outer sleeve portion having one end integrally formed with the inner periphery of said annular false bottom and extending outwardly of said smaller end of said outer sleeve portion, and a bottom wall portion integrally formed with the outwardly-extending end of said inner sleeve portion.

2. A butt cap as defined in claim 1 wherein that part of said outer sleeve portion surrounding said inner sleeve portion is of gradually increasing thickness from its outer to its inner end.

3. A butt cap as defined in claim 2 wherein said inner sleeve portion is convergingly tapered from said one end thereof to its outer end, thereby to define, with said gradually increasing thickness part of said outer sleeve portion, an annular recess the inner and outer walls of which are divergent.

4. A butt cap as defined in claim 3 integrally molded of a tough synthetic plastic material.

References Cited

UNITED STATES PATENTS

| 1,550,080 | 8/1925 | Lehrritter | 43—25.2 |
| 2,144,122 | 1/1939 | Pflueger | 43—25 |
| 2,556,403 | 6/1951 | Sokolik | 43—25.2 |

SAMUEL KOREN, *Primary Examiner.*

D. J. LEACH *Assistant Examiner.*